(12) United States Patent
Verlinden et al.

(10) Patent No.: US 10,951,836 B2
(45) Date of Patent: Mar. 16, 2021

(54) VIDEO DISPLAY DEVICE WITH STROBE EFFECT

(71) Applicant: Martin Professional ApS, Arhus (DK)

(72) Inventors: Wouter Verlinden, Keerbergen (BE); Simon Allan, Kent (GB)

(73) Assignee: HARMAN PROFESSIONAL DENMARK APS, Aarhus N. (DK)

( * ) Notice: Subject to any disclaimer, the term of this patent is extended or adjusted under 35 U.S.C. 154(b) by 0 days.

(21) Appl. No.: 14/720,694

(22) Filed: May 22, 2015

(65) Prior Publication Data

US 2015/0358555 A1 Dec. 10, 2015

(30) Foreign Application Priority Data

Jun. 5, 2014 (EP) .................................. 14 171 286

(51) Int. Cl.
*H04N 5/262* (2006.01)
*H04N 5/45* (2011.01)
(Continued)

(52) U.S. Cl.
CPC .............. *H04N 5/2625* (2013.01); *A63J 5/02* (2013.01); *G09G 3/32* (2013.01); *H04N 5/145* (2013.01); *H04N 5/445* (2013.01); *H04N 5/45* (2013.01); *H04N 21/4122* (2013.01); *H04N 21/4312* (2013.01); *H04N 21/4316* (2013.01); *H04N 21/4348* (2013.01); *H04N 21/440281* (2013.01); *H04N 21/4854* (2013.01); *H05B 47/155* (2020.01); *G09G 2320/0257* (2013.01)

(58) Field of Classification Search
CPC ............ H04N 5/445; H04N 5/14; H04N 5/45; H04N 5/2625; H04N 5/145; H04N 21/4402; H04N 21/4316; H04N 21/4312

USPC ........................ 348/565; 345/76; 315/241 S
See application file for complete search history.

(56) References Cited

U.S. PATENT DOCUMENTS 6,097,450 A * 8/2000 Humphrey ............. G02B 26/04
349/13
6,459,919 B1 * 10/2002 Lys ...................... A61N 5/0616
315/291
(Continued)

FOREIGN PATENT DOCUMENTS

CN       101180889 A       5/2008
CN       102036083 A       4/2011
(Continued)

OTHER PUBLICATIONS

European Search Report for Application No. EP 14 17 1286 dated Jul. 23, 2014.

(Continued)

*Primary Examiner* — Jefferey F Harold
*Assistant Examiner* — Omer Khalid
(74) *Attorney, Agent, or Firm* — Artegis Law Group, LLP

(57) ABSTRACT

A video display device comprises an arrangement of light sources for displaying video content. Further, the video display device comprises a controller that is configured to control the light sources to display the video content. Further, the controller is configured to control the light sources according to strobe control information to perform a strobe effect by periodically switching the light sources between a first state and a second state, e.g., between a state of low brightness and a state of high brightness.

12 Claims, 6 Drawing Sheets

STROBE ON

STROBE OFF (51) Int. Cl.

| | |
|---|---|
| *H04N 5/445* | (2011.01) |
| *H04N 21/434* | (2011.01) |
| *H04N 5/14* | (2006.01) |
| *H04N 21/4402* | (2011.01) |
| *H04N 21/431* | (2011.01) |
| *G09G 3/32* | (2016.01) |
| *H04N 21/41* | (2011.01) |
| *A63J 5/02* | (2006.01) |
| *H04N 21/485* | (2011.01) |
| *H05B 47/155* | (2020.01) |

(56) References Cited

U.S. PATENT DOCUMENTS

| | | | |
|---|---|---|---|
| 2002/0097252 A1 | 7/2002 | Hirohata | |
| 2005/0116667 A1* | 6/2005 | Mueller | E04F 13/08 |
| | | | 315/312 |
| 2005/0285449 A1* | 12/2005 | Rush | H04B 15/02 |
| | | | 307/116 |
| 2009/0059589 A1 | 3/2009 | Huang et al. | |
| 2009/0322800 A1* | 12/2009 | Atkins | G09G 3/3413 |
| | | | 345/690 |
| 2010/0097302 A1 | 4/2010 | Lee et al. | |
| 2011/0122467 A1* | 5/2011 | Futterer | G02F 1/133524 |
| | | | 359/9 |
| 2011/0133649 A1* | 6/2011 | Kreiner | H05B 33/0842 |
| | | | 315/86 |
| 2011/0159929 A1* | 6/2011 | Karaoguz | H04N 13/0404 |
| | | | 455/566 |
| 2012/0113167 A1* | 5/2012 | Margerm | G09G 3/3426 |
| | | | 345/690 |

FOREIGN PATENT DOCUMENTS

| | | |
|---|---|---|
| CN | 102473382 A | 5/2012 |
| WO | 2011/011548 A1 | 1/2011 |
| WO | 2011011548 A1 | 1/2011 |

OTHER PUBLICATIONS

Barco: "ImagePro-11 user's guide", Sep. 22, 2012, XP002727576, URL: http://www.qed-productions.com/downloads/barco/imageProll-userGuide.pdf.

BakersTuts: "After Effects Tutorial: Black Strobe Flashes" Feb. 15, 2013, XP054975471, URL: http://www.youtube.com/watch?v=KvHfAyRgS6s.

* cited by examiner

VIDEO DISPLAY DEVICE WITH STROBE EFFECT

CROSS-REFERENCE TO RELATED APPLICATIONS

The present application claims priority to European patent application titled, "VIDEO DISPLAY DEVICE WITH STROBE EFFECT," filed on Jun. 5, 2014 and having Application No. 14 171 286.9. The subject matter of this related application is hereby incorporated herein by reference.

TECHNICAL FIELD

The present invention relates to a video display device, to a video controller, a video system, and to a method of controlling a video display device.

BACKGROUND

For example in the entertainment industry, it is known to use video display devices for displaying video content. A known way of implementing such video display devices is to use an array of LEDs (Light Emitting Diodes), which can be individually controlled according to pixel information of the video content.

Such video display devices may for example be used in the background of a stage, on the sides of a stage, or at other positions. For example, the displayed video content may show a live picture of an entertainer on the stage, so that a close-up image of the entertainer is also visible in parts of the audience which are located further away from the stage. Alternatively, the displayed video content may also be pre-fabricated and be used to generate a certain atmosphere in combination with various kinds of light effects. Still further, it is known to use pre-fabricated video content to provide certain light effects, which are otherwise produced by dedicated lighting devices. For example, a video-display device could show pre-fabricated video content to illuminate the background of the stage with a certain color or color pattern.

A specific light effect which can also be produced by pre-fabricated video content is a strobe effect. In this case, the video content may for example correspond to a periodically repeated sequence of one or more homogeneously white video frames, followed by one or more homogeneously black video frames.

However, this way of producing a strobe effect has some limitations. For example, the strobe rate is limited by the frame rate of the video content, which is typically in the range of 24 Hz to 60 Hz. Further, also the strobe pattern itself, e.g., the ratio of a "strobe on" phase of maximum brightness to a "strobe off" phase may be limited by the video frame rate, in particular when approaching the maximum possible strobe rate. Still further, it may be difficult to synchronize the strobe effect provided by the video display device with other light effects, e.g., a conventional strobe device.

Accordingly, there is a need to provide a more versatile support of a strobe effect by a video display device.

SUMMARY

According to an embodiment of the invention, a video display device is provided. The video display device comprises an arrangement of light sources for displaying video content. The arrangement of light sources may correspond to an array of LEDs. Further, the video display device comprises a controller which is configured to control the light sources to display the video content. One or more of the light sources may be assigned to each pixel of the video content, and these one or more light sources may be controlled according to color and/or brightness information of that pixel, as defined by the video content. Further, the controller is configured to control the light sources according to strobe control information to perform a strobe effect by periodic switching the light sources between a first state and a second state. These two states typically differ with respect to their brightness or color appearance. For example, one of the states may correspond to a maximum brightness value of light emission by the light sources, e.g., full white. The other state may correspond to a minimum brightness value of light emission by the light sources, e.g., full black. Accordingly, the strobe effect may be performed by switching the light sources between a minimum brightness value and a maximum brightness value. However, also other configurations are possible, e.g., switching between a maximum brightness value and an intermediate brightness value, switching between a minimum brightness value and an intermediate brightness value, or switching between two different intermediate brightness values, or switching between two different colors.

The video display device may further comprise an interface which is configured to receive the strobe control information. This interface may at the same time be configured to receive the video content. The interface may be configured to receive the video content in a sequence of data packets, and the strobe control information may be included in one or more of these data packets.

According to a further embodiment, a video controller is provided. The video controller comprises an interface with respect to at least one video display device which comprises an arrangement of light-sources for displaying video content, such as the video display of the above embodiment. The interface is configured to send strobe control information to the at least one video display device to control a strobe effect performed by the video display device. The strobe effect is performed by periodic switching between a first state and a second state, e.g., as described above.

The interface of the video controller may be further configured to send the video content. The interface may be configured to send the video content in a sequence of data packets, and the strobe control information may be included in one or more of these data packets.

According to a further embodiment of the invention, a system is provided. The system comprises at least one video display device. Each of such video display devices may be configured as described in connection with the above embodiment. Further, the system comprises a video controller, such as the video controller of the above embodiment. The at least one video display device comprises an arrangement of light sources for displaying video content and is configured to control the light sources to display the video content and control the light sources according to strobe control information to perform a strobe effect by periodic switching the light sources between a first state and a second state. The video controller is configured to send the strobe control information to the at least one video display device.

According to a further embodiment of the invention, a method of controlling a video display device is provided. According to the method, an arrangement of light sources of the display device is controlled to display video content, e.g., by a controller of the video display device. Further, the light sources are controlled according to strobe control information to perform a strobe effect by periodic switching between a first state and a second state. This control of the strobe effect can be accomplished by the same controller of the video display device which is used for controlling the light sources to display the video content.

The strobe effect may also be combined with displaying the video content. In this case, in the first state light emission by the light sources may be controlled on the basis of the video content, while in the second state light emission by the light sources is controlled to a level which is defined independently of the video content. This level may correspond to a minimum brightness value. Alternatively, this level may correspond to a maximum brightness value. In the second state, also the color of the light sources may be controlled independently of the video content, e.g., to a certain color indicated by the strobe control information. Alternatively, the color information of the video content could also be applied for controlling the color of the light sources in the second state. In this way, the strobe effect may be generated in the same color appearance as the video content.

By the strobe control information, a rate of the periodic switching between the first state and the second state, i.e., the strobe rate, can be controlled independently of a frame rate of the video content. The rate of said periodic switching may higher than the frame rate of the video content. Further, also strobe rates below the frame rate of the video content can be flexibly set, without requiring any matching of the switching time instances to the sequence of video frames.

In the above embodiments, the strobe control information may indicate a rate of the periodic switching, i.e., the strobe rate. For example, the strobe rate may be indicated in by a digital value, e.g., of 8 or 16 bit, which represents the strobe rate in Hz.

The strobe control information may also indicate a start and/or end of the periodic switching, i.e., the start or end of the strobe effect. For example, one of the data packets may indicate that the video display device shall start the strobe effect, and another of the data packets may indicate that the video display device shall stop the strobe effect. Such data frames may be specific data frames which are also used to control the timing of video frames of the video content.

The strobe control information may also indicate a duration of the first state and/or of the second state, e.g., as digital values, e.g., of 8 or 16 bit, which represent the duration in ms. Alternatively, the duration of the first state and of the second state may also be indicated in terms of a ratio of the duration of the first state and the duration of the second state, i.e., in terms of a duty cycle parameter.

Further details of the above and further embodiments will be apparent from the following detailed description in connection with the accompanying drawings.

DETAILED DESCRIPTION

In the following, embodiments of the invention will be described in more detail and with reference to the accompanying drawings. These embodiments relate to video display devices with an arrangement of light sources in the form of an array of LEDs, to a video controller for controlling one or more of such video display devices, and to a method of controlling one or more of such video display devices.

Figure 1:
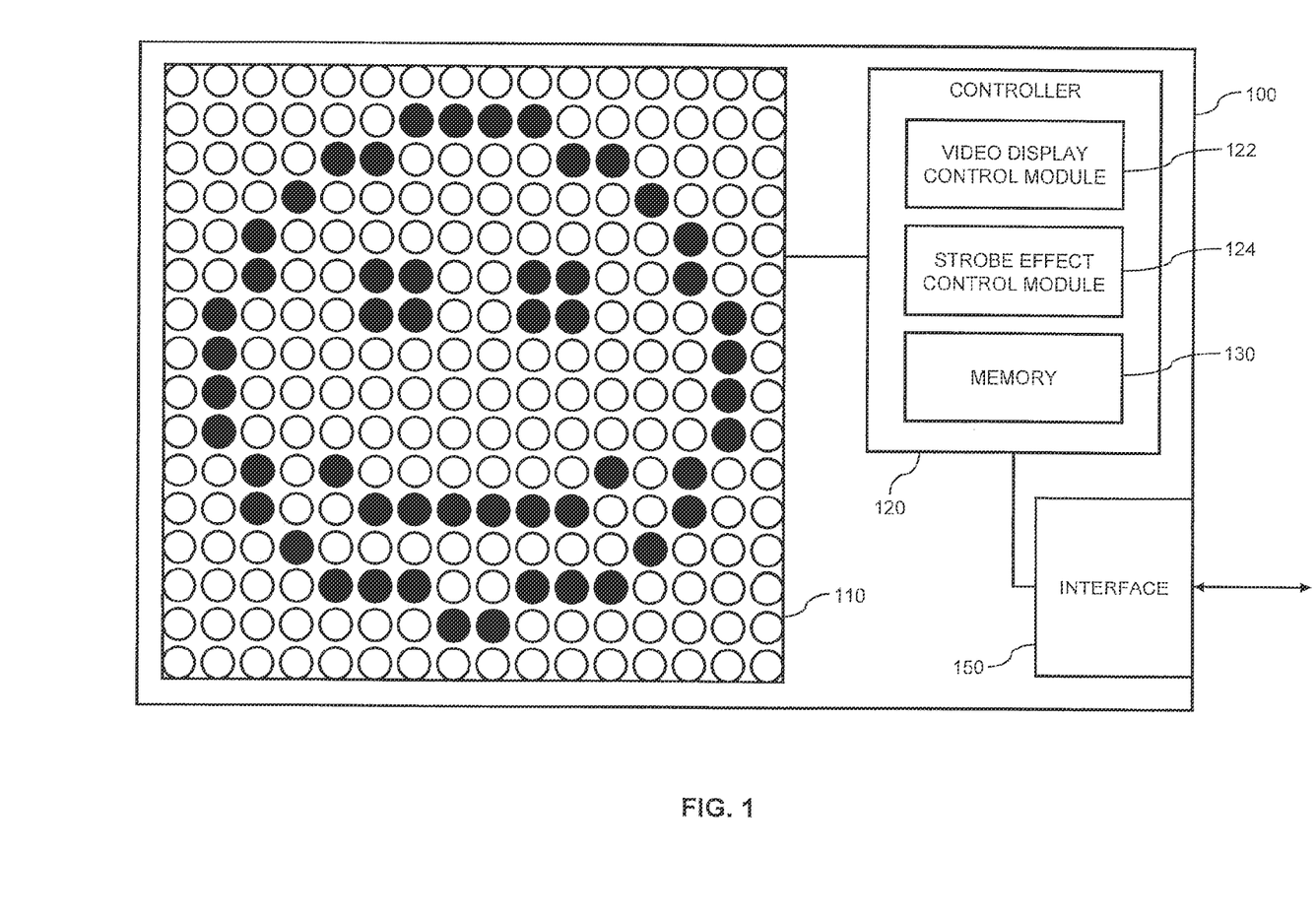
FIG. 1 schematically illustrates a video display device according to an embodiment of the invention.

FIG. 1 schematically illustrates an exemplary implementation of the video display device 100. As illustrated, the video display device 100 includes an arrangement of light sources 110. In the illustrated implementation, the arrangement of light sources 110 is assumed to be an array of LEDs. Here, it is to be understood that the illustrated number of light sources 110 and their geometric arrangement in a rectangular matrix is merely exemplary. For example, in alternative implementations a higher or lower number of light sources 110 could be utilized. Further, the arrangement of light sources 110 could alternatively based on other grid types, e.g., a hexagonal grid, or a linear arrangement.

Light emission by the light sources 110 is assumed to be individually controllable, so that one or more of the light sources may be used to show a corresponding pixel of video content. For example, the light sources 110 may include multi-color LEDs, and each of these multi-color LEDs may be individually controlled according to brightness information and/or color information of a corresponding pixel of the video content. For example, the video content may define a Red (R) color channel, a Blue (B) color channel, and a Green (G) color channel. In some implementations, also a set of three, four or more individual LEDs may be used to represent a pixel of the video content. In this case, such set may for example include a red LED, a blue LED, and a green LED, and the RGB color channels may be used to control the corresponding LEDs of the set.

As further illustrated, the video display device 100 includes a controller 120 and an interface 150. The controller 120 is generally responsible for controlling the arrangement of light sources 110 by generating a drive signal for each of the light sources 110. For displaying the video content, the drive signals are generated depending on the video content. The interface 150 may be used to provide the video content to the video display device 100. In addition, as will be further explained below, the interface 150 may be used to provide various kinds of control information to the video display device 100. The interface 150 may be implemented on the basis of a physical layer and MAC (Medium Access Control) layer of an Ethernet technology, i.e., the data packets may correspond to Ethernet packets.

The interface 150 may operate by transmitting the video content in a sequence of data packets. Each video frame of the video content may be transmitted in one or more data packets which contain the data for each pixel of the video frame. In the following, such data packets will also be referred to as pixel data packet. When using the Ethernet technology, in which Ethernet packets are limited to about 1500 bytes in size, approximately 500 pixels with 8 bit resolution of the RGB channels or 250 pixels with 16 bit resolution of the RGB channels may be sent in a single pixel data packet. If the display device 100 is provided with a larger number of pixels, multiple pixel data packets may be utilized to transfer the pixel information of the video frame. Having received the pixel information of a single video frame, the video frame may be buffered by the controller 120, e.g., in the memory 130. This buffering allows for later displaying the video frame at a desired time instance, which is indicated in a specific low-latency data packet, in the following also referred to as Frame Sync data packet. The low latency of the Frame Sync data packet may be achieved by providing the Frame Sync data packet with a small size, e.g., of 80 or less bytes. For example, the payload of the Frame Sync packet may substantially consist of a frame identifier, which indicates which of the previously transmitted video frames shall be displayed. In this way, the time of displaying of a certain video frame is not affected by potential time variations due to transferring the pixel information of the video frame to the display device 100. This is specifically useful if the display device 100 is combined with one or more additional display devices to display video content in a synchronized manner. In such scenarios, the Frame Sync packet may be transmitted in a broadcast mode, so that the Frame Sync packet is received substantially simultaneously by all combined video display devices.

In the illustrated implementation, the video display device 100 is not only operable to display the video content, but also supports a strobe effect. For this purpose, the controller 120 is provided with a video display module 122, which is responsible for generating the drive signals of the light sources 110 depending on the video content, and a strobe effect control module 124. The strobe effect is obtained by generating the drive signals of the drive sources to periodically switch the light sources 110 between a first state and a second state, e.g., a "strobe on" state in which the light sources 110 emit light with high brightness and a "strobe off" state in which the light sources 110 emit light with low brightness or are completely switched off. Here, it should be noted that the strobe on state may correspond to emitting white light with high brightness, but that also other colors could be used. Similarly, also in the strobe off state any color could be emitted with low brightness, e.g., dark blue or red. In some examples, the strobe effect may also involve switching between two different colors, e.g., between red and blue. In the latter case, the strobe on state and the strobe off state may also have substantially similar brightness. The strobe effect is controlled depending on strobe control information. The strobe control information may be defined independently of the video content. The interface 150 may be used to provide the strobe control information to the video display device 100.

The controller 120 may for example be implemented by one or more processors which execute program code stored in a memory 130. Such program code may implement the functionalities of the video display control module 122 and/or of the strobe effect control module 124. However, it is to be understood that at least a part of the functionalities of the controller 120 may also be implemented by dedicated hardware components. The memory 130 may also be used to store other information, e.g., one or more predefined strobe patterns to be utilized for controlling the strobe effect.

In some implementations, the video display device 100 may support at least two different modes of operation: For example, in a first mode of operation, the light sources 110 may be controlled to display the video content, without performing the strobe effect, while in a second mode of operation, the light sources 110 may be controlled to perform the strobe effect independently from the video content, by switching between the strobe on state and the strobe off state as defined in the strobe control information. In some implementations, the strobe effect may also combined with the displaying of the video content. For example, the strobe on state may correspond to a state in which the light sources 110 are controlled to display the video content, while the strobe off state may correspond to a state in which the light sources 110 are controlled to a low brightness level or completely switched off. Alternatively, the strobe off state may correspond to a state in which the light sources 110 are controlled to display the video content, while the strobe on state may correspond to a state in which the light sources 110 are controlled to a high brightness level. In some implementations, it is also possible that a part of the light sources 110 is controlled to display the video content while another part of the light sources 110 is controlled to perform the strobe effect.

Figure 2:
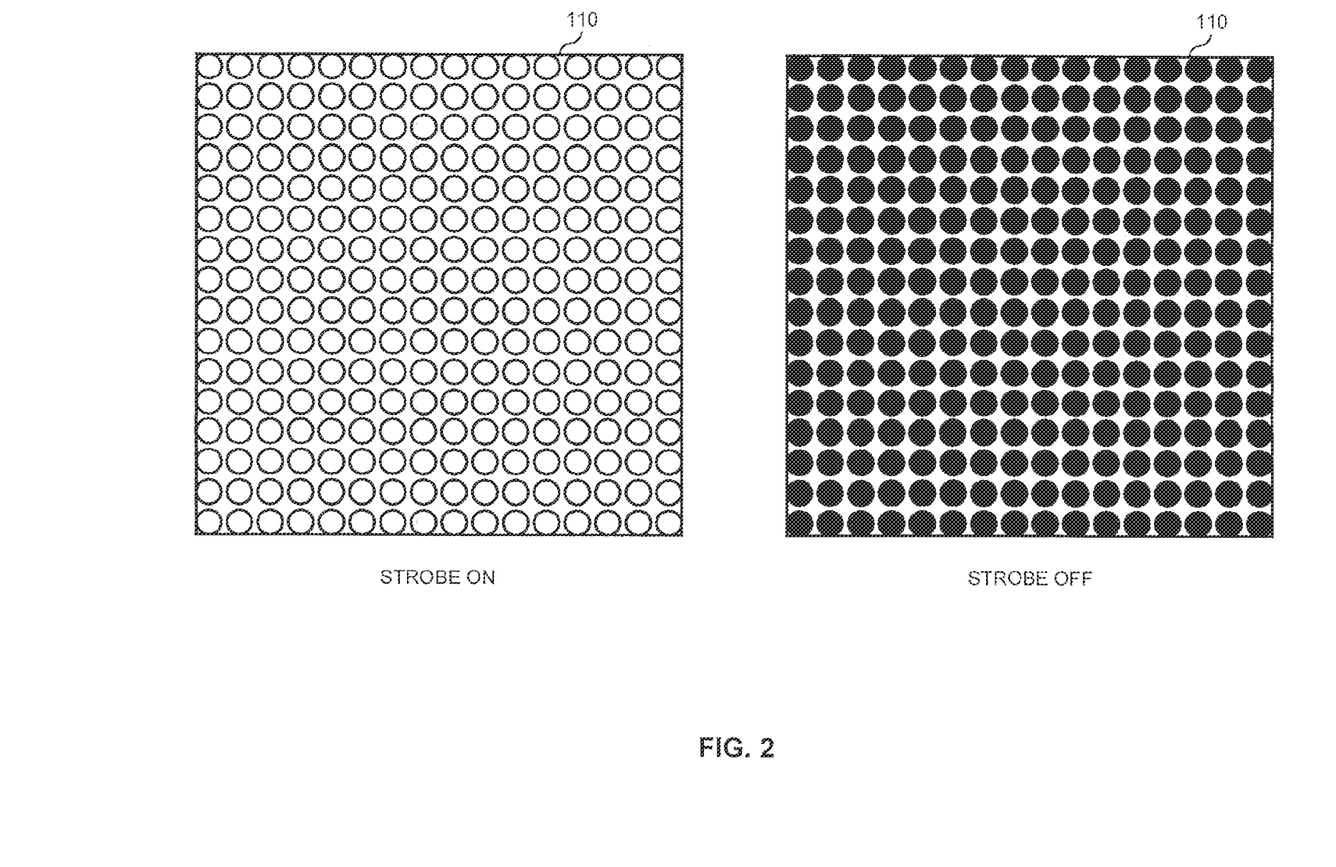
FIG. 2 schematically illustrates an example of a strobe on and a strobe off state as used in an embodiment of the invention.

FIG. 2 schematically illustrates an example of how the strobe on state and the strobe off state can be implemented: In the strobe on state, all light sources 110 are controlled to emit light with a high brightness level, e.g., with a maximum brightness level supported by the light sources 110. In the strobe off state, all light sources 110 are controlled to emit light with a low brightness level, e.g., with a minimum brightness level supported by the light sources 110. Of course, the low brightness level may also be obtained by completely switching off the light sources 110.

Figure 3:
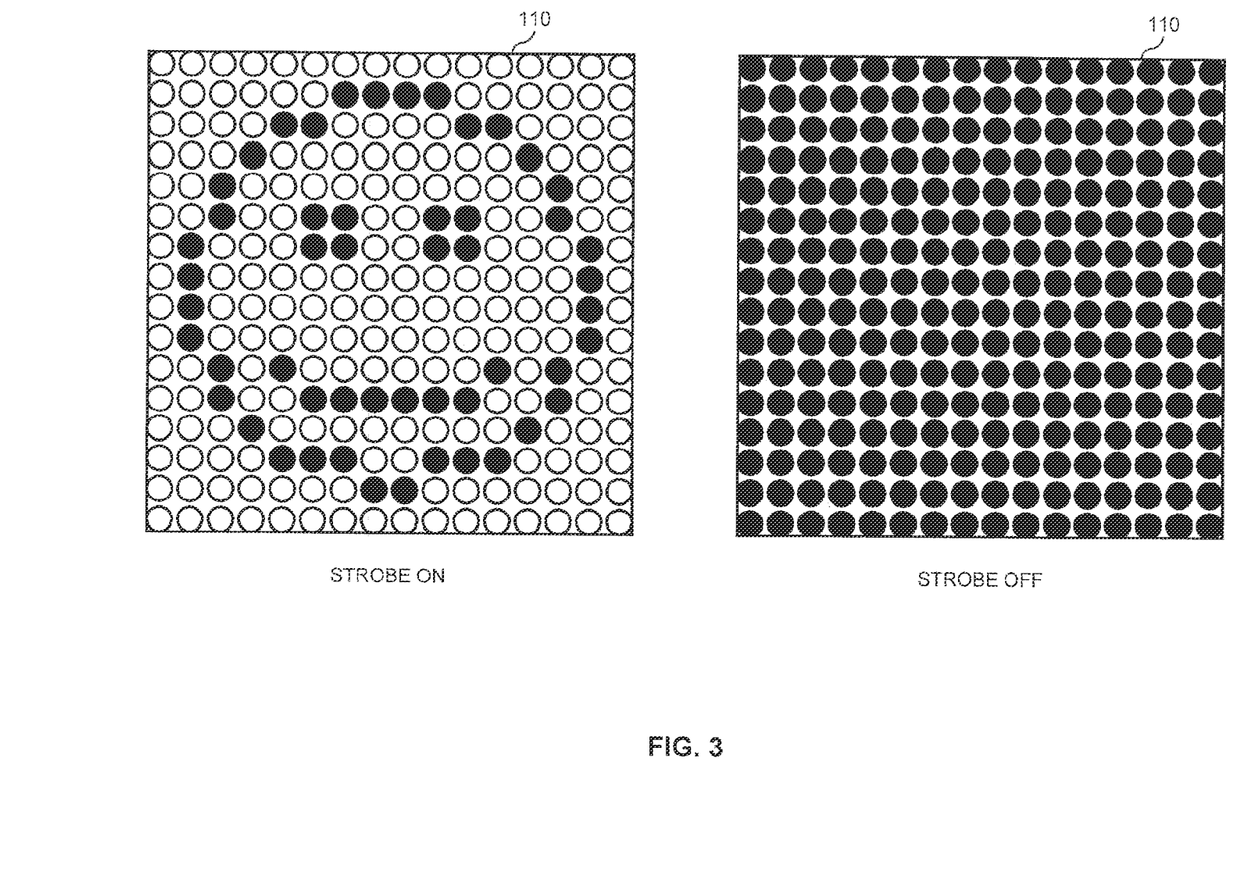
FIG. 3 schematically illustrates a further example of a strobe on and a strobe off state as used in an embodiment of the invention.

FIG. 3 schematically illustrates a further example of how the strobe on state and the strobe off state can be implemented: In the strobe on state, all light sources 110 are controlled to display the video content. In the strobe off state, all light sources 110 are controlled to emit light with a low brightness level, e.g., with a minimum brightness level supported by the light sources 110. Also in this case, the low brightness level may be obtained by completely switching off the light sources 110. In the example of FIG. 3, the strobe effect is more impressive if the overall brightness of the video content is high.

Figure 4:
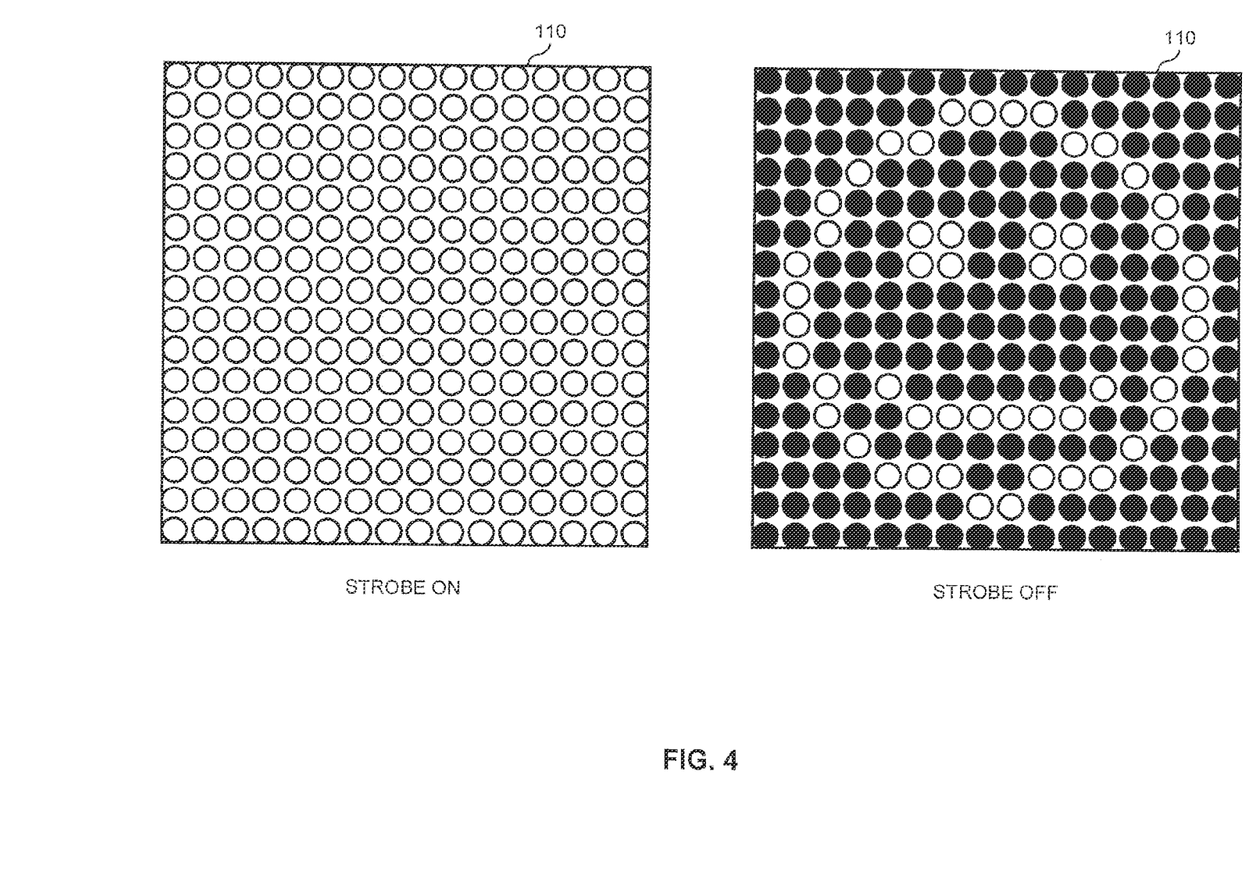
FIG. 4 schematically illustrates a further example of a strobe on and a strobe off state as used in an embodiment of the invention.

FIG. 4 schematically illustrates a still further example of how the strobe on state and the strobe off state can be implemented: In the strobe on state, all light sources 110 are controlled to emit light with a high brightness level, e.g., with a maximum brightness level supported by the light sources 110. In the strobe off state, all light sources 110 are controlled to display the video content. In the example of FIG. 3, the strobe effect is more impressive if the overall brightness of the video content is low.

The strobe control information may define various kinds of parameters which are utilized to generate the strobe effect. The strobe control information may define a strobe rate, e.g., in terms of a frequency of repeating the sequence of the strobe off state and the strobe on state. The strobe rate may be set independently of a frame rate of the video content. This specifically allows for achieving strobe rates which are higher than the frame rate of the video content. The strobe control information may also define a duration of the strobe on state and/or the strobe off state, e.g., in terms of an absolute time or a duty cycle parameter. The strobe control information may also indicate a mode of the strobe effect, e.g., a mode as explained in connection with FIG. 2, a mode as explained in connection with FIG. 3, or a mode as explained in connection with FIG. 4. Still further, also a certain strobe pattern could be indicated by the strobe control information, e.g., a pattern in which the strobe rate is ramped up or a pattern in which the strobe rate is ramped down. Further, the strobe control information may also indicate colors or brightness levels to be applied in the strobe on state and/or the strobe off state.

Further, the strobe control information may also indicate a start and/or end of the strobe effect. The start or stop of the strobe effect may be initiated by a Frame Sync packet received on the interface 150. As mentioned above, the Frame Sync packet may include an identifier of a certain video frame which was previously transmitted to the video display device. This video frame may then include further details of the strobe control information, such as the strobe rate, duration of the strobe on state and/or strobe off state, a strobe pattern or mode to be applied, or the like. Accordingly, a part of the strobe control information may be included in a pixel data packet used for transmitting a video frame to the video display device 100, while the Frame Sync packet indicates when this strobe control information shall be applied by the video display device 100. In some implementations, the strobe control information may also indicate a duration of the strobe effect. In the latter case, the strobe effect may continue over one or multiple video frames until the intended duration ends, without requiring that the end of the strobe effect is indicated separately.

Figure 5:
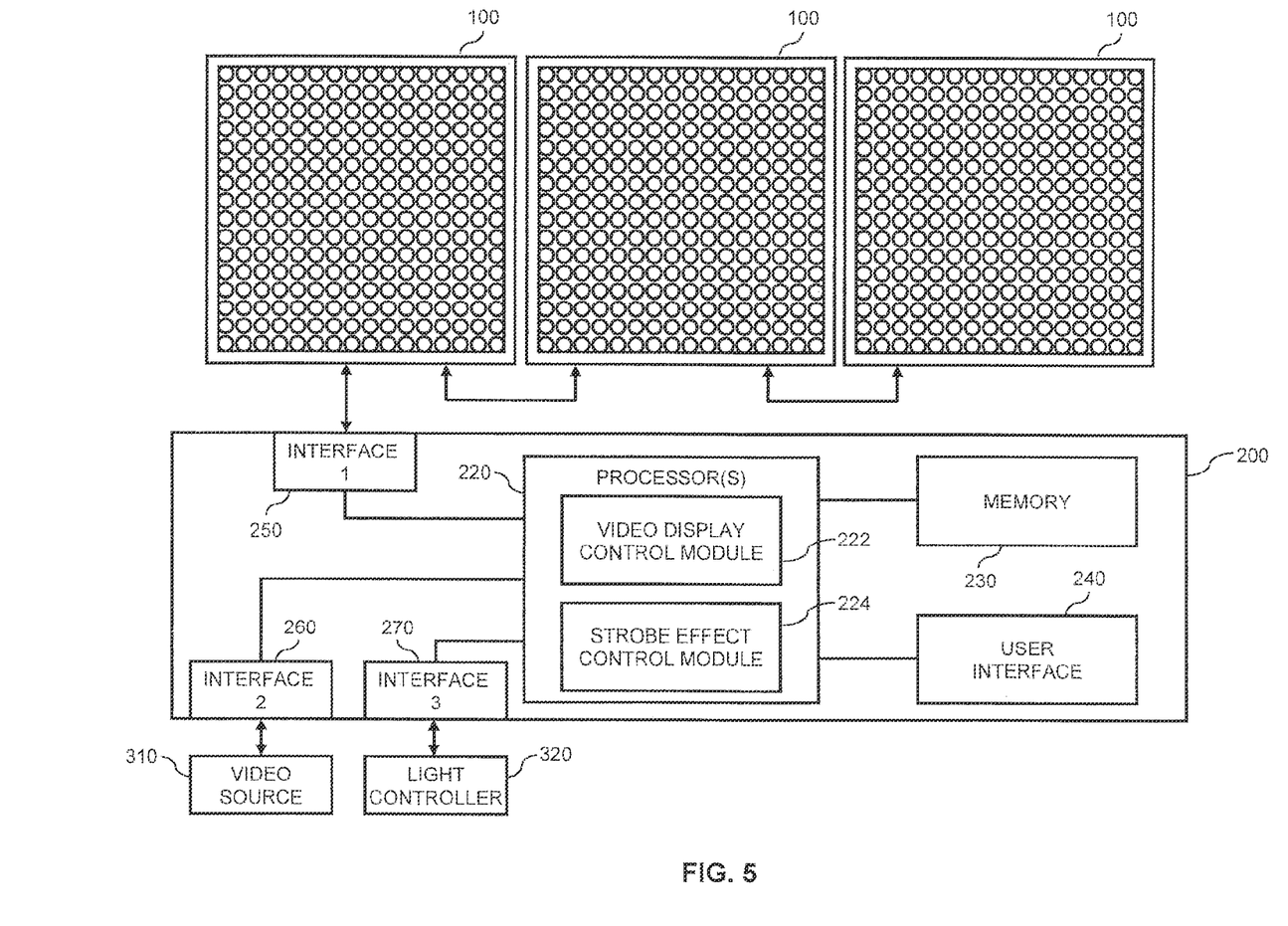
FIG. 5 schematically illustrates a video system according to an embodiment of the invention.

FIG. 5 schematically illustrates a video system which includes a plurality of video display devices 100 and a video controller 200 which controls the video display devices 100. Each of the video display devices 100 may be configured and operate as explained above. The video controller 200 is configured to provide the video content and the strobe control information to the video display devices 100. The video display devices 100 may be utilized to display the video content in a synchronized manner Here, it is to be understood that this displaying of the video content in a synchronized manner may involve simultaneously displaying the same video frame on each of the display devices 100. However, it is also possible to use a more complex distribution of the video content over multiple display devices 100, which means that the video frames simultaneously displayed by the display devices 100 may differ from one display device 100 to the other. This may for example be the case if the video display devices 100 are operated as a single display with a larger number of pixels. In such cases, the video controller 200 may also be responsible for spatially mapping the pixels of the video content to the appropriate pixels of the different video display devices 100.

As illustrated, the video controller 200 is provided with one or more processors 220 which implement a video display control module 222 and a strobe effect control module 224. The video display control module 222 is responsible for generating the video frames to be displayed by the video display devices 100 from the video content. The strobe effect control module 224 is responsible for generating the strobe control information to be applied by the video display devices 100. The video display control module 222 and the strobe effect control module 224 may be implemented by corresponding program code to be executed by the processor(s) 220. The video content may be stored in a memory 230 of the video controller 200. Alternatively or in addition, the video content 200 may be provided from an external video source 310. The strobe control information generated by the strobe effect control module 224 may be based on user inputs of an operator, such as for example received via a user interface 240 of the video controller 200. Alternatively or in addition, the strobe control information generated by the strobe effect control module 224 may be based on predefined data, such as for example stored in the memory. Still further, the strobe control information generated by the strobe effect control module 224 may be based on inputs received from an external light controller 320.

As illustrated, the video controller 200 is provided with a first interface 250 for connecting the video controller 200 to the video display devices 100, e.g., to the above-mentioned interface 150 of the video display device 100. Accordingly, also the interface 250 may be implemented on the basis of a physical layer and MAC layer of an Ethernet technology and may be used to transmit the above-mentioned pixel data packets and Frame Sync packets. For connecting multiple display devices 100 to the video controller, these display devices 100 may be connected in a chain configuration, as for example illustrated in FIG. 5. That is to say, a first display device 100 of the chain configuration may be connected directly to the first interface 250 of the video controller 200, and from this first display device 100, a connection to the next display device 100 of the chain configuration is provided, and so on. However, it is to be understood that other topologies of connecting multiple display devices to the video controller 200 may be used in addition or as an alternative. For example, a star-type topology could be used, e.g., by connecting a switch to the first interface 250 of the video controller 200 and connecting the display devices 100 individually to the switch. Further, multiple chain configurations could be connected to such switch. Still further, even tree-type topologies with multiple switches and chain configurations are possible.

As further illustrated, the video controller 200 may be provided with a second interface 260 for connecting to the external video source 310 and/or with a third interface for connecting to the external light controller 320. The second interface 310 may be a digital interface, such as a DVI (Digital Visual Interface) or HDMI (High Definition Multimedia Interface). Alternatively, the second interface 310 may be an analog interface, such as a VGA (Video Graphics Array) or Component Video interface. The third interface 270 may for example be a DMX (Digital Multiplex) interface.

The video controller 200 may utilize the above-mentioned Frame Sync packets to achieve synchronized display of the video content by the multiple display devices 100. For this purpose, the video controller 200 may broadcast a Frame Sync packet to the video display devices 100, and upon reception of this Frame Sync packet the video display devices will immediately start displaying the video frame identified by the Frame Sync packet. In a similar manner, a synchronization of the strobe effect can be achieved. The pixel data packet(s) utilized to transmit a video frame with a certain identifier to the video display devices 100 may include the strobe control information to be applied while displaying this video frame. Upon receiving the a Frame Sync packet with this identifier, each video display device 100 will immediately start performing the strobe effect as defined by the strobe control information. Accordingly, since the Frame Sync packet is a low latency data packet which is received substantially simultaneously by all the video display devices 100, the strobe effect will start substantially simultaneously on each of the video display devices 100.

Although the video system of FIG. 5 is illustrated as including multiple video display devices 100, it is to be understood that also configurations with only a single video display device 100 are possible. Further, it is to be understood that configurations may be provided in which multiple video display devices 100 of different size, pixel number, and/or geometry are combined.

Figure 6:
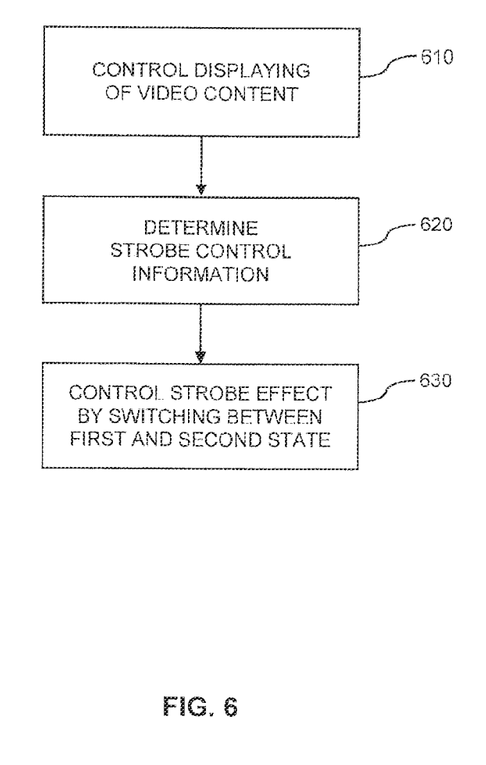
FIG. 6 shows a flowchart for illustrating a method according to an embodiment of the invention.

FIG. 6 shows a flowchart for illustrating a method of controlling a video display device 100. The steps of the method may for example be implemented in the video display device 100 of FIG. 1 or in the video system of FIG.

5. The steps of the method may be performed by a controller, such as the controller 120 of the video display device 100, or the video controller 200 of the video system.

At step 610, an arrangement of light sources of the video display device is controlled to display video content.

At step 620, strobe control information is determined. For example, a controller of video display device, such as the controller 120, may receive the strobe control information, e.g., from a video controller, such as the video controller 200. Step 620 may also involve that a video controller, such as the video controller 200, determines the strobe control information. For example, the video controller may determine the strobe control information depending on user inputs of an operator and/or depending on inputs from an external light controller.

The strobe control information may be transmitted via an interface to the video display device, such as via the interface 150 of the video display device 100 and the interface 250 of the video controller 200. The same interface may also be utilized for transmitting the video content to the video display device. The interface may be configured for transmission of the video content in a sequence of data packets, and the strobe control information may be included in one or more of the data packets, such as in the above mentioned pixel data packets and/or Frame Sync packets.

At step 630, the light sources are controlled to perform a strobe effect by periodic switching between a first state and a second state. The first and second state may correspond to a strobe on state and a strobe off state, such as explained in connection with the examples of FIGS. 2, 3, and 4.

For example, in the first state the light sources may be controlled to emit with high brightness, and in the second state the light sources may be controlled to emit with low brightness or be switched of completely, such as in the example of FIG. 2. Further, in the first state light emission by the light sources may be controlled on the basis of the video content, and in the second state light emission by the light sources may controlled to a level which is defined independently of the video content, such as in the examples of FIGS. 3 and 4. The level which is defined independently of the video content may correspond to a minimum brightness value, such as in the example of FIG. 3. Further, the level which is defined independently of the video content may correspond to a maximum brightness value, such as in the example of FIG. 4.

The control of the light sources in step 630 is performed according to the strobe control information as determined at step 620. A controller of the video display device, such as the controller 120, may implement the control of the light sources by generating drive signals for the light sources of the display device depending on the strobe control information. A video controller may implement the control of the light sources by sending the strobe control information to the video display device. The rate of the periodic switching may be defined independently of a frame rate of the video content, e.g., higher than the frame rate of the video content. In step 630, the strobe effect may be controlled according to a strobe rate indicated in the strobe control information. Further, a start and/or end of the strobe effect may be controlled according to the strobe control information. Still further, a duration of the first state and/or of the second state may be controlled according to the strobe control information.

It is to be understood that the above embodiments and implementations are merely exemplary and susceptible to various modifications. For examples, various other kinds of light sources could be used for implementing the video display device. Further, between the video display device and the video controller also other interface technologies may be used in addition or as an alternative to the Ethernet technology. Still further, it is to be understood that the video display device or the video controller may be equipped with various kinds of known functionalities of such devices.

We claim:

1. A video display device, comprising:
an arrangement of light sources, wherein the light sources are individually-controllable;
an interface configured to receive video content and strobe control information that indicates a first frequency at which the light sources should be switched between a first state and a second state, wherein the first frequency indicated in the strobe control information is independent of a frame rate of the video content; and
a controller configured to control individual light sources within the arrangement of light sources to display the video content according to the strobe control information, wherein one or more light sources included in the arrangement of light sources are assigned to represent each individual pixel of the video content, wherein the controller is further configured to cause a strobe light effect to be displayed by periodically switching one or more of the individual light sources between the first state and the second state at the first frequency, wherein the strobe light effect produces flashes that are visually perceptible to a viewer, and wherein the first frequency is included in a range of frequencies such that switching the one or more of the individual light sources between the first state and the second state at the first frequency produces the flashes that are visually perceptible to the viewer,
wherein, in the first state, light emissions by the individual light sources are controlled to display a frame corresponding to the video content, and in the second state, light emissions by the individual light sources are controlled based on a level that is defined independently of the video content.

2. The video display device according to claim 1, wherein the level corresponds to a minimum brightness value.

3. The video display device according to claim 1, wherein the level corresponds to a maximum brightness value.

4. The video display device according to claim 1, wherein the first frequency of periodically switching the individual light sources between the first state and the second state is greater than the frame rate of the video content.

5. The video display device according to claim 1, wherein the interface is configured to receive the video content in a sequence of one or more pixel data packets, and the strobe control information is included in one or more of the pixel data packets.

6. The video display device according to claim 1, wherein the strobe control information indicates at least one of a start and an end of periodically switching the individual light sources between the first state and the second state.

7. The video display device according to claim 1, wherein the strobe control information indicates a duration of time for maintaining the individual light sources in at least one of the first state and the second state.

8. A video controller, comprising:
an interface for at least one video display device that includes an arrangement of light sources for displaying video content, wherein the light sources are individually-controllable,
wherein the interface is configured to send the video content and strobe control information that indicates a first frequency at which the light sources should be switched between a first state and a second state to the at least one video display device, wherein the first frequency indicated in the strobe control information is independent of a frame rate of the video content, wherein the at least one video display device causes the video display device to control individual light sources within the arrangement of light sources to produce a strobe light effect to be displayed by periodically switching one or more of the individual light sources between the first state and the second state at the first frequency, wherein the strobe light effect produces flashes that are visually perceptible to a viewer, wherein one or more light sources included in the arrangement of light sources are assigned to represent each individual pixel of the video content, and wherein the first frequency is included in a range of frequencies such that switching the one or more of the individual light sources between the first state and the second state at the first frequency produces the flashes that are visually perceptible to the viewer, wherein, in the first state, light emissions by the individual light sources are controlled to display a frame corresponding to the video content, and in the second state, light emissions by the individual light sources are controlled based on a level that is defined independently of the video content.

9. The video controller according to claim 8, wherein the interface is configured to send the video content in a sequence of data packets, and the strobe control information is included in one or more of the data packets.

10. A system, comprising:
at least one video display device that includes an arrangement of light sources for displaying video content, wherein the light sources are individually-controllable, and an interface configured to receive the video content and strobe control information that indicates a first frequency at which the light sources should be switched between a first state and a second state, wherein the first frequency indicated in the strobe control information is independent of a frame rate of the video content, wherein the at least one video display device is configured to control individual light sources within the arrangement of light sources to display the video content according to the strobe control information, wherein one or more light sources included in the arrangement of light sources are assigned to represent each individual pixel of the video content, wherein the at least one video display device is further configured to produce a strobe light effect to be displayed by periodically switching one or more of the individual light sources between the first state and the second state at the first frequency, wherein the strobe light effect produces flashes that are visually perceptible to a viewer, and wherein the first frequency is included in a range of frequencies such that switching the one or more of the individual light sources between the first state and the second state at the first frequency produces the flashes that are visually perceptible to the viewer; and a video controller configured to send the strobe control information to the at least one video display device, wherein, in the first state, light emissions by the individual light sources are controlled to display a frame corresponding to the video content, and in the second state, light emissions by the individual light sources are controlled based on a level that is defined independently of the video content.

11. A method for controlling a video display device, comprising:
receiving video content and strobe control information that indicates a first frequency at which light sources should be switched between a first state and a second state, wherein the first frequency indicated in the strobe control information is independent of a frame rate of the video content;
controlling an arrangement of light sources of the video display device to display the video content, wherein the light sources are individually-controllable, and wherein one or more light sources included in the arrangement of light sources are assigned to represent each individual pixel of the video content; and
according to the strobe control information, controlling individual light sources within the arrangement of light sources to perform a strobe light effect to be displayed by periodically causing one or more of the individual light sources to switch between the first state and the second state at the first frequency, wherein the strobe light effect produces flashes that are visually perceptible to a viewer, wherein the first frequency is included in a range of frequencies such that switching the one or more of the individual light sources between the first state and the second state at the first frequency produces the flashes that are visually perceptible to the viewer,
wherein, in the first state, light emissions by the individual light sources are controlled to display a frame corresponding to the video content, and in the second state, light emissions by the individual light sources are controlled based on a level that is defined independently of the video content.

12. The video display device according to claim 1, wherein the controller is further configured to receive additional strobe control information included in one or more frame sync packets and to control the arrangement of light sources to display the video content according to the additional strobe control information.

* * * * *

UNITED STATES PATENT AND TRADEMARK OFFICE
CERTIFICATE OF CORRECTION

PATENT NO. : 10,951,836 B2  
APPLICATION NO. : 14/720694  
DATED : March 16, 2021  
INVENTOR(S) : Wouter Verlinden and Simon Allan Page 1 of 1

It is certified that error appears in the above-identified patent and that said Letters Patent is hereby corrected as shown below:

On the Title Page (71) Applicant:  
Please delete "Martin Professional ApS, Arhus (DK)" and insert --HARMAN PROFESSIONAL DENMARK APS, Arhus (DK)--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*